United States Patent [19]

Oaki

[11] Patent Number: 4,989,161

[45] Date of Patent: Jan. 29, 1991

[54] CONTROL UNIT FOR A MULTI-DEGREE-OF FREEDOM MANIPULATOR

[75] Inventor: Junji Oaki, Komae, Japan

[73] Assignee: Kabushiki Kaisha Toshiba, Kawasaki, Japan

[21] Appl. No.: 161,760

[22] Filed: Feb. 29, 1988

[30] Foreign Application Priority Data

Feb. 27, 1987 [JP] Japan ................................. 62-43182

[51] Int. Cl.$^5$ ............................ B25J 9/16; G06F 9/00
[52] U.S. Cl. ................................. 364/513; 364/167.01; 901/9; 901/23
[58] Field of Search .............. 364/513, 474.12, 167.01, 364/513; 318/561, 568, 632; 901/20, 23, 9

[56] References Cited

U.S. PATENT DOCUMENTS

| | | | |
|---|---|---|---|
| 4,218,172 | 8/1980 | Freud | 364/513 |
| 4,547,858 | 10/1985 | Horak | 364/513 |
| 4,603,284 | 7/1986 | Perzley | 364/513 |
| 4,608,651 | 8/1986 | Murakami et al. | 364/513 |
| 4,621,332 | 11/1986 | Sugimoto et al. | 364/513 |
| 4,725,942 | 2/1988 | Osuka | 364/513 |

OTHER PUBLICATIONS

Hewit et al., "Fast Dynamic Decoupled Control for Robotics, Using Active Force Control," Mechanism and Machine Theory, vol. 16, No. 5, 1981, pp. 535–542.
Soviet Inventions Illustrated, Week 7942, 28th Nov. 1979, Abstracts No. 8950B/42, Derwent Publications Ltd, London, GB & SU-A-639699 (Berezkin VP), 12-08-1977.
Arai et al., "Bilateral Control for Manipulators with Different Configurations," IECON, Oct. 1984, vol. 1, pp. 40–45.
Patent Abstracts of Japan, vol. 9, No. 116 (P-357) (1839), 21st May, 1985.

Primary Examiner—Jerry Smith
Assistant Examiner—Paul Gordon
Attorney, Agent, or Firm—Foley & Lardner, Schwartz, Jeffery, Schwaab, Mack, Blumenthal & Evans

[57] ABSTRACT

A control unit for a multi-degree-of-freedom manipulator comprising a torque sensor for detecting the force exerting on each joint shaft and operational means for adding first and second correction values to the input signals to the motor actuator in accordance with the torque signal produced from the torque sensor. With this construction, non-linear and interference forces as well as effects due to the low rigidity of the joints can be removed without identifications of the link or arm parameters, and a striking improvement of the control performance can be achieved.

9 Claims, 2 Drawing Sheets

CONTROL UNIT FOR A MULTI-DEGREE-OF FREEDOM MANIPULATOR

BACKGROUND OF THE INVENTION

1. Field of the Invention

The present invention relates to a control unit for a multi-degree-of-freedom manipulator, more particularly to a control unit having high performance taking into consideration of dynamic characteristics of a manipulator without increasing the number of calculations needed for control.

2. Description of the prior Art

In order to increase the control performance of a multi-degree-of-freedom device, In general, it is important to take into consideration of the dynamic characteristics such as inertial force and, gravity force of each link or arm. One example of the control unit for a multi-degree-of-freedom manipulator is shown in FIG. 1.

In FIG. 1, a controller 7 carries out a modeling of the manipulator as a rigid multi-link mechanism, calculates through a non-linear compensation element 5, non-linear forces such as inertial force, gravity force in accordance with parameters such as each angle and angular velocity of each joint 3-1, 3-2, ..., 3-n and interference forces such as interference from other links, contacting force with installation, external forces exerting on links, e.g., disturbance depending on the gripped materials and compensates for the non-linear forces for each joint in accordance with the result of the calculations.

In the controllers according to the prior art, however, parameters such as link inertia and, the center of gravity within a rigid model of the manipulator 1 have to be known. As a result, it is difficult to accurately identify or determine these parameters, so that when they deviate from true values, it is no longer possible to increase the control performance. Furthermore, even if these parameters are accurately identified, the non-linear compensation element 5 in the controller 7 has to perform a great number of on-line calculations. As a result, the control performance is reversely decreased as shortening of the control intervals becomes difficult.

Moreover, the manipulator 1 is not necessarily rigid, one, in practice, but rather is a low rigid one about each joint, due to the spring characteristics of torque transmission mechanisms such as reduction gears. Accordingly, unless taking into consideration of these points, errors occur in the link vibrations and link angles, thereby decreasing the control performance.

In the conventional controllers as described above, it results in parameter errors and the increase of control time period or intervals when the non-linear and interference forces of the manipulator are compensated for, as well as decreasing the control performance by link vibrations and link angle errors due to the low rigidity of joints.

SUMMARY OF THE INVENTION

It is therefore an object or the present invention to overcome the above drawbacks and to provide an improved control unit for a multi-degree-of-freedom manipulator.

It is a further object of the present invention to provide a control unit for a multi-degree-of-freedom manipulator wherein non-linear and interference forces, as well as effects due to the low rigidity of the joints, can be removed without identification of the link parameters, and a striking improvement of the control performance can be achieved.

It is yet a further object of the present invention to provide a control unit for a multi-degree-of-freedom manipulator wherein there is provided each torque sensor for detecting forces exerting on each of the joint shafts and operational means for adding correction values to the input signals to the manipulator in accordance with the output signal produced from each of the torque sensors.

It is another object of the present invention to provide a control unit for a multi-degree-of-freedom manipulator wherein link vibrations and link angle errors due to flexure can be prevented by the compensation for the non-linear and interference forces exerting on each joint by addition of correction values to the input signals and by a feedback signal of the twist angle of each joint, thereby enabling desired actions of joints to be controlled at a high accuracy.

One feature of the present invention resides in a control unit for a multi-degree-of-freedom manipulator, which comprises a non-linear and interference force compensation control system having a torque sensor for detecting the torque exerting on each of the joint shafts and a first operator and a flexure and vibration compensation control system having a second operator, a first correction value being produced through the first operator which multiplies the torque signal produced from the torque sensor by the reciprocal of the reduction gear ratio, a second correction value being produced through the second operator which multiplies the torque signal produced from the torque sensor by the reciprocal of the spring constant.

Another feature of the present invention resides in a control unit for a multi-degree-of-freedom manipulator having a motor actuator, which comprises a torque sensor for detecting the force exerting on each of the joint shafts and operational means for adding first and second correction values to the input signals to the motor actuator in accordance with the torque signal produced from the torque sensor.

These and other objects, features and advantages will be apparent from the following detailed description of the embodiment with reference t the accompanying drawings.

DETAILED DESCRIPTION OF THE PREFERRED EMBODIMENTS

Figure 1:
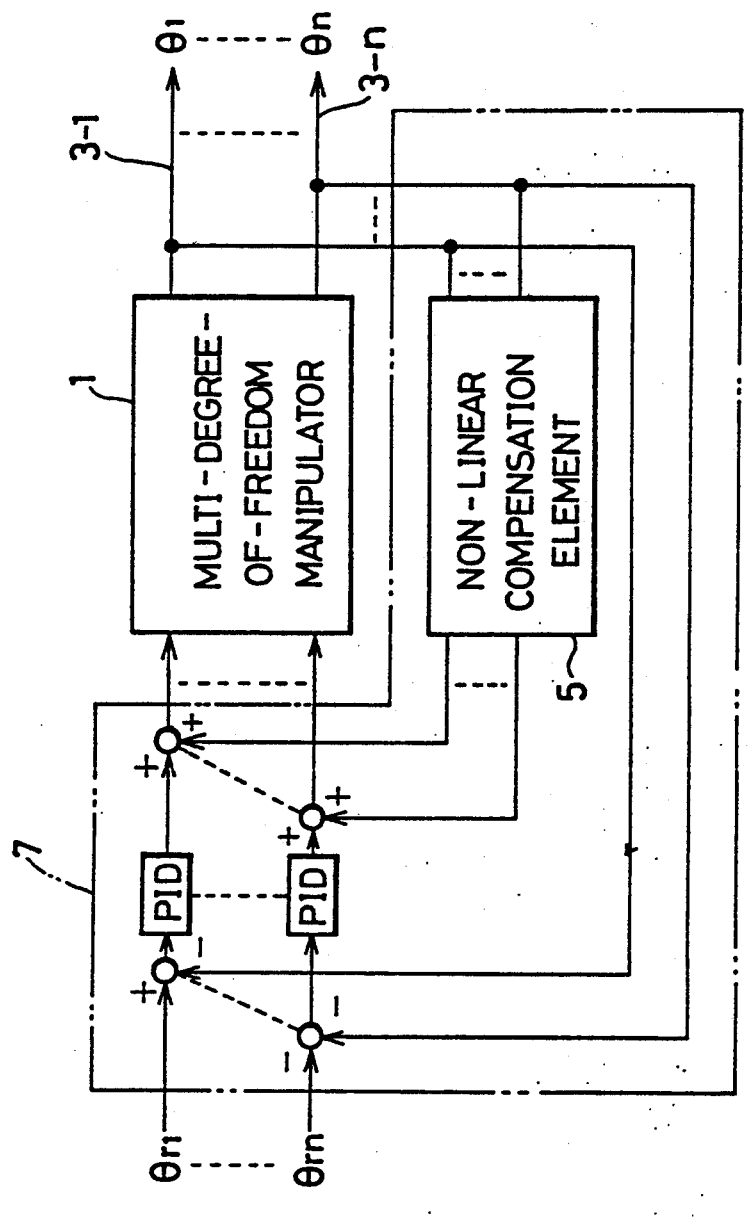
FIG. 1 shows a controller for a multi-degree-of-freedom manipulator according to the prior art.
Figure 2:
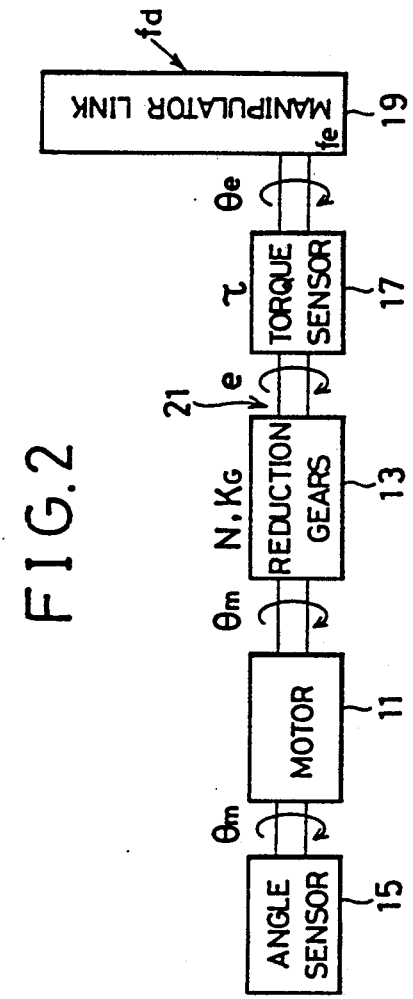
FIG. 2 shows one joint portion of the multi-degree-of-freedom manipulator associated with the control unit according to the present invention.

FIG. 2 shows an embodiment of one joint of the multi-degree-of-freedom manipulator according to the present invention.

The joint comprises a motor 11 as an actuator, reduction gear means 13, an angle sensor 15, and a torque sensor 17, which are coupled through each manipulator link 19 to the subsequent stages, equal to the number of the degree-of-freedoms of the manipulator. Reference numeral 21 indicates a joint shaft. The other joints are all constructed in a similar manner, as shown in FIG. 2.

The angle sensor 15 detects the rotational angle $\theta m$ of the motor 11 while the reduction gear means 13 reduces the rotational speed of the motor 11 as well as generating a torque sufficient to drive the link 19. The torque sensor 17 detects the force exerting on the joint shaft 21, a torque $\tau$ relating to the output shaft of, for instance, the reduction gear means 13, so as to seek a sum of the non-linear force fe such as an inertial force, a gravitation force due to the link 19 and interference force fd such as interference from other links, contact with other installations, external forces exerting on the links such as disturbances due to gripped materials, as indicated in equation (1) below;

$$\tau = fe + fd \qquad (1)$$

Since the reduction gear means 13 is not a perfectly rigid material due to the existence of spring characteristics of gears in the means 13 in this case, the following twist will be produced;

$$e = (\theta m/N) - \theta e \qquad (2)$$

suppossing that N ($\geq$ 1) indicates the reduction gear ratio when the rotational angle of the input shaft is $\theta m$ and the rotational angle of the output shaft is $\theta e$. Accordingly, the following relationship is established when the spring constant of the reduction gear means 13 is KG;

$$\tau = KG \cdot e \qquad (3)$$

In this case, if the torque sensor 17 is made of a low rigidity material, the spring constant KG becomes the sum of the both.

Figure 3:
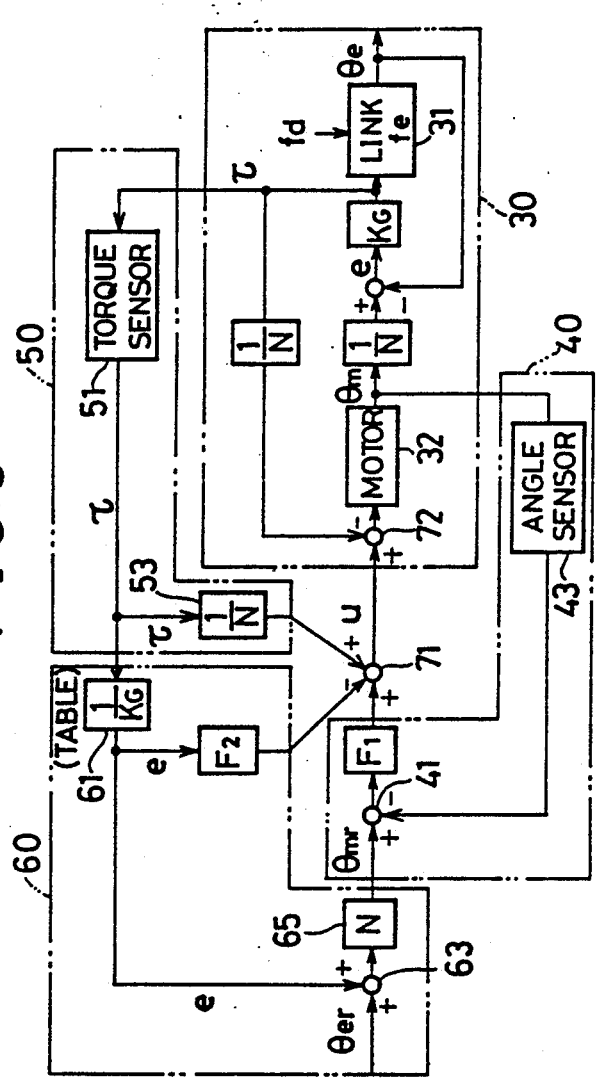
FIG. 3 shows one embodiment of the control unit for the multi-degree-of-freedom manipulator, according to the present invention.

FIG. 3 shows a block diagram of a control unit for each joint, according to the present invention. The control unit comprises a motor link system 30, a motor rotational angle position control system 40, a non-linear and interference force compensation control system 50 and a joint shaft flexure vibration compensation control system 60.

The equations (1), (2) and (3) are satisfied in the motor link system 30 and when the link 31, which corresponds to that of the link 19 in FIG. 2, is driven by the torque $\tau$ indicated above, the force of ($-\tau/N$) is fed back to the motor 32 which corresponds to the motor 11 in FIG. 2 due to the action and reaction principle. Accordingly, the torque $\tau$ is detected by the torque sensor 51 in the non-linear and interference force compensation control system 50 and it is multiplied by the factor of 1/N in operational means 53, so as to supply the result of the calculation to an adder 71. Namely, in this case, it is constructed in such a manner that a correction value $\tau/N$ in accordance with a force signal, i.e., the torque signal $\tau$ produced from the torque sensor 41 is added to the input signal to a motor 32 as an actuator, so that the correction value is equal to the torque $\tau$ divided by the reduction gear ratio N. As a result, it is possible to cancel the reaction of the equation (1), i.e., $\tau$ (the sum torque) = fe (non-linear force) and fd (interference force), thereby completely realizing the linearization of each shaft of the manipulator and preventing the interference thereto.

Now, in the joint shaft flexure vibration compensation control system 60, the twist angle e is sought in an operator 61 by a multiplication of the torque $\tau$ detected by the torque sensor 51 by the reciprocal of the spring constant KG of the joint, i.e., 1/KG which has preliminarily been sought. How to detect the spring constant KG is as follows; The motor 32 associated with the shaft to be detected is secured by a brake so as not allow the input shaft of the reduction gear means to be rotated. With this condition, a predetermined force f is applied to the extreme end of the link in question which is located at the distance l from the joint shaft 21 and the displacement of the link end is measured. Then, the shaft torque $\tau$ at that time is read from the torque sensor 5. The spring constant KG can be calculated by the following equation;

$$KG = \tau/(d/l), \text{ that is, } \tau = f \cdot l \qquad (4)$$

In this case, since the force f and the distance l are known, a calibration of the torque sensor 51 can be also carried out at the same time by measuring the torque $\tau$. This operation may be performed for each joint shaft. In this case, however, it is normal that the spring constant KG is not generally a constant value but it has some non-linear characteristics. For this reason, it may be convenient to make a look-up table of the values $\tau$ vs KG for each joint shaft, so as to calculate the spring constant KG corresponding to the actual torque value $\tau$ in the operator 61. Accordingly, when the signal corresponding to the twist angle e is applied to an operational means such as a PID operator, its output signal is fedback to an adder 71, and it is applied to the motor 32 which corresponds to the motor 11 in FIG. 2, the vibrations of the link 31 which corresponds to the link 19 due to the twist of the joint shaft 21 can be suppressed. That is the reason why the correction value in this case becomes the twist angle e of the joint shaft 21 which is equal to the torque $\tau$ divided by the spring constant KG of the articulation shaft 21. In order to prevent the errors of the link angle $\theta e$ due to the flexure of the joint shaft 21, the twist angle e is firstly added to a target link angle value of $\theta et$ in an adder 63 and then it is multiplied by N times in an operator 65 so as to determine a new motor angle target value $\theta mr$ as follows;

$$\theta mr = (\theta er + e)N = (\theta er + \tau/KG)N \qquad (5)$$

On the other hand, the following calculation is carried out in the motor rotational angle position control system 40: The rotational angle ($-\theta m$) of the motor 32 which corresponds to the motor 11 in FIG. 2 and which is detected by an angle sensor 43 (which corresponds to the angle sensor 15 in FIG. 2) is added to the predetermined motor angle $\theta mr$ in an adder 41 (which may also be a subtracter 41) and the result of the calculation is applied to the input of operator such as a PID operator F1. The output signal from the operator F1 is then applied to an adder 71, so that the current link angle $\theta e$ can follow up to the link angle target value $\theta er$ without deviation. Here again, the correction value is based on the twist angle e of the joint shaft 21 which is equal to the force signal (the torque $\tau$) divided by the spring constant KG of the joint shaft 21.

The present invention is not limited to the foregoing embodiment and various modifications may be made. For instance, instead of the torque sensor 17 provided at each joint shaft for detecting a force exerting on each joint shaft, a six-shaft force sensor similar to those disclosed in the Japanese Patent Application 61-172249 may be provided at the mounted portion of the manipulator hand so as to perform the non-linear calculations by using a signal from the angle sensor provided at each joint shaft while distributing the forces exerting on hand ends or fingers into each joint shaft torque so as to exert it on the joint shaft, respectively.

According to the present invention, the non-linear and interference forces exerting on the manipulator, as well as positioning errors due to flexure and vibrations generated by the low rigidity of joints can be prevented without necessitating the troublesome identifications of link parameters.

In addition, controls and calculations become rather simple and control intervals or periods can also be shortened by the control unit for a multi-degree-of-freedom manipulator according to the present invention, thus strikingly improving the control performance of the multi-degree-of-freedom manipulator.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A control unit for a multi-degree-of-freedom manipulator and having a motor link system including a motor for producing an output torque at each joint shaft actuator and a motor rotational angle position control system, which further comprises:
   a non-linear and interference force compensation control system having a torque sensor for detecting a torque ($\tau$) exerting on each joint shaft and a first operator;
   a flexure and vibration compensation control system having a second operator,
   a first correction value being produced through said first operator which multiplies a torque signal ($\tau$) produced from the torque sensor by a reciprocal of a reduction gear ratio (1/N),
   a second correction value being produced through said second operator which multiplies the torque signal ($\tau$) produced from the torque sensor by a reciprocal of a spring constant (1/KG) of each joint; and
   operational means for adding the first and second correction values to input signals to the motor actuator.

2. The control unit for a multi-degree-of-freedom manipulator as claimed in claim 1 wherein said flexure and vibration compensation control system further comprises a third operator (F2) for producing an operational signal in accordance with the second correction value, an adder for adding a target value of a link angle ($\theta$er) and the second correction value as an actual twist angle (e), and a fourth operator for producing a target value of the motor angle ($\theta$mr) multiplied by the reduction gear ratio of N.

3. The control unit for multi-degree-of-freedom manipulator as claimed in claim 2 wherein said third operator F2 is a PID functional operator.

4. The control unit for a multi-degree-of-freedom manipulator as claimed in claim 1 wherein said motor rotational angle position control system comprises an angle sensor for detecting an actual rotational angle ($\theta$m) of the motor actuator and a second adder for adding a target value of the motor angle and an actual motor rotational angle signal from the angle sensor.

5. The control unit for a multi-degree-of-freedom manipulator as claimed in claim 4 wherein said operational means comprises a third adder for adding an output signal from the second adder and said first and second correction values.

6. The control unit for a multi-degree-of-freedom manipulator as claimed in claim 5 wherein said motor link system further comprises a fourth adder for adding an output signal from the third adder and a feedback signal of ($-\tau$/N).

7. A control unit for a multi-degree-of-freedom manipulator, comprising:
   a motor;
   a reduction gear; and
   a link; said control unit comprising:
   a torque sensor for detecting any torque exerted upon the input of said link;
   a means connected to said torque sensor for multiplying any torque detected by said torque sensor by the reciprocal number of the reduction ratio of said reduction gear; and
   a means connected to said multiplying means for increasing the input signal to said motor by the torque multiplied by the reciprocal number of the reduction ratio.

8. A control unit for a multi-degree-of-freedom manipulator having a motor actuator by which an output torque is produced through each joint shaft, which comprises:
   torque sensing means for detecting the force exerted on each joint shaft; and
   operational means for adding first and second correction values to input signals to the motor actuator in accordance with a torque signal produced from said torque sensing means.
   wherein the first correction value to be applied to one input of the operational means is equal to the torque signal divided by the reduction gear ratio of the motor actuator side.

9. A control unit for a multi-degree-of-freedom manipulator having a motor actuator by which an output torque is produced through each joint shaft, which comprises:
   torque sensing means for detecting the force exerted on each joint shaft; and
   operation means for adding first and second correction values to input signals to the motor actuator in accordance with a torque signal produced from said torque sensing means; wherein
   the second correction value to be applied to an input of the operational means is equal to the torque signal divided by a reduction gear ratio of the motor actuator side.

* * * * *